Jan. 8, 1929.
W. SCOTT
1,698,008
LOCKING DEVICE FOR STEERING WHEELS OF MOTOR CARS
Filed July 25, 1927
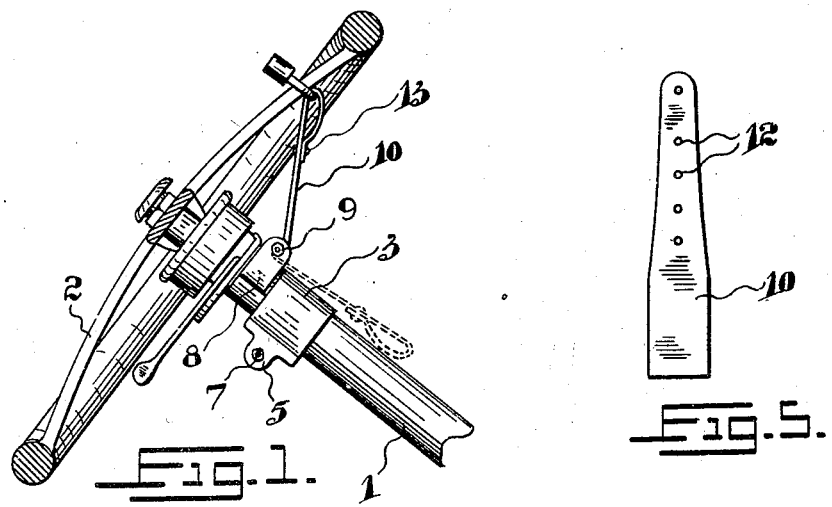
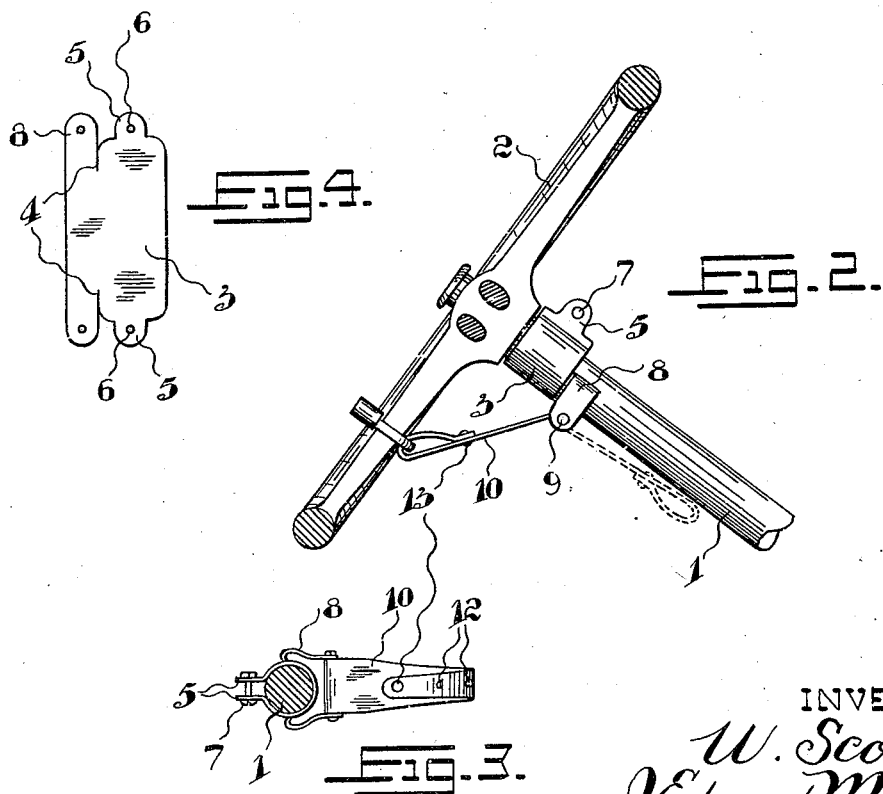
INVENTOR.
W. Scott.
BY J. Edward Marbee.
ATTY.

Patented Jan. 8, 1929.

1,698,008

UNITED STATES PATENT OFFICE.

WALTER SCOTT, OF LONDON, ONTARIO, CANADA.

LOCKING DEVICE FOR STEERING WHEELS OF MOTOR CARS.

Application filed July 25, 1927. Serial No. 208,120.

This invention relates to locking devices for motor vehicles and particularly to that type of lock which is adapted to prevent turning movement of the steering wheel and comprises a supporting element adapted to be clamped on the steering column, and having a locking element thereon for engagement with the steering wheel.

In locking devices of this type it has usually been necessary to provide different sizes for different models of cars on account of the differences in construction of the cars and my chief object is to devise a construction which is adapted for use with the majority of models on the market.

A further object is to devise a construction which is quickly and easily attached in place and at the same time is cheap to construct and yet strong and of good appearance.

I attain my object by means of the constructions hereinafter described and illustrated in the accompanying drawings in which Fig. 1 is a side elevation of my device applied to the steering column of a motor car;

Fig. 2 a similar view showing a different method of mounting the device;

Fig. 3 a plan view of the locking device;

Fig. 4 a plan view of the blank from which the supporting member is formed;

Fig. 5 a plan view of the blank from which the locking member is formed.

In the drawings like numerals of reference indicate corresponding parts in the different figures.

1 indicates the steering column of a motor car and 2 the steering wheel.

My device comprises a supporting member clamped on the steering column and a locking member. The supporting member is formed from an integral piece of sheet metal, the main part 3 of which is adapted to encompass the steering column. This piece of sheet metal is slit at each end at 4. The parts of the ends at one side of the slits are extended outwardly to form arms 5 having holes 6 formed therein through which a bolt 7 is passed. The parts of the ends at the side of the slits are doubled back to form arms 8 having holes formed therein for the passage of a hinge bolt 9 on which the locking member is hinged.

The locking member is formed as a metal strap, 10, one end being bent up to provide the bearing for the hinge bolt 9. At the other end of the strap are formed a plurality of holes 12. The strap is doubled back on itself and a bolt 13, as indicated in Figs. 1 and 2, is passed through the outermost hole 12 and one of the other holes depending on the length of locking member desired.

The ends of the bolts 7, 9 and 13 will be upset to prevent the unscrewing of the nuts, although if desired rivets may be employed in place of the bolts and nuts.

The device may be used in the position shown in Fig. 1, or in the position shown in Fig. 2 depending on the space provided. The bolt 13 will, of course, not be placed in position until it has been determined what model of car it is to be used on, and hence the length of the locking member may be made to suit.

In use a padlock will be used to secure the locking member to one of the arms or spokes of the steering wheel.

From the above description it will be seen that I have devised a construction which will satisfactorily attain the object of my invention.

What I claim as my invention is:

1. In a locking device of the character described, the combination of a supporting member adapted to the fitted about a steering column; a locking member of bendable metal swingably mounted on said supporting member, said locking member having formed therein a hole near the outer end thereof and a series of other holes with any one of which the first mentioned hole may be alined by suitably bending the member.

2. In a locking device of the character described, the combination of a sheet metal body adapted to be fitted about a steering column having a clamping lug formed integral therewith at each end thereof; means for retaining the clamping lugs in clamping position; an extension at one side of and integral with said body; supporting arms integral with said extension and extending in a direction opposite to the clamping lugs; and a locking member swingably supported on said supporting arms.

3. In a locking device of the character described, the combination of a sheet metal body adapted to be fitted about a steering column having a clamping lug formed integral therewith at each end thereof;

means for retaining the clamping lugs in clamping position; an extension at one side of and integral with said body; supporting arms integral with said extension and extending in a direction opposite to the clamping lugs; and a locking member of bendable metal swingably supported on said supporting arms, said locking member having formed therein a hole near the outer end thereof and a series of other holes with any one of which the first mentioned hole may be alined by suitably bending the member.

Signed at London, Ontario, this twentieth day of July, A. D. 1927.

WALTER SCOTT.